Figure 1:
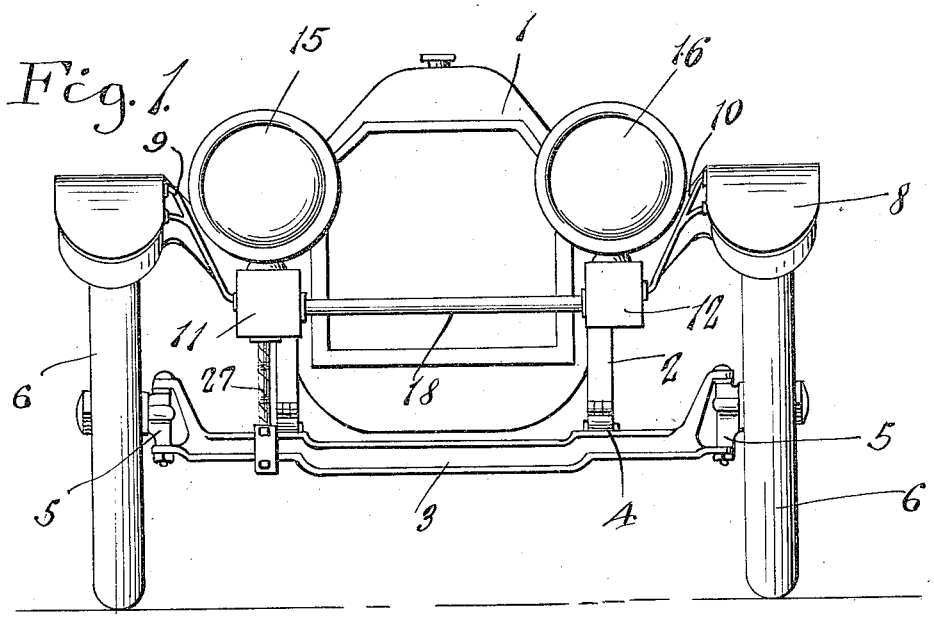

H. L. HEDEEN.
AUTOMOBILE HEADLIGHT.
APPLICATION FILED JAN. 24, 1917.

1,245,913.

Patented Nov. 6, 1917.

Inventor
H. L. Hedeen.

UNITED STATES PATENT OFFICE.

HERBERT L. HEDEEN, OF LAKE ANDES, SOUTH DAKOTA.

AUTOMOBILE-HEADLIGHT.

1,245,913. Specification of Letters Patent. Patented Nov. 6, 1917.

Application filed January 24, 1917. Serial No. 144,165.

*To all whom it may concern:*

Be it known that I, HERBERT LAWRENCE HEDEEN, a citizen of the United States, residing at Lake Andes, in the county of Charles Mix and State of South Dakota, have invented certain new and useful Improvements in Automobile-Headlights; and I do hereby declare the following to be a full, clear, and exact description of the invention, such as will enable others skilled in the art to which it appertains to make and use the same.

This invention relates to an automobile headlight and has for its primary object the provision of means whereby the headlight may be so mounted upon an automobile and connected to the steering mechanism thereof so that the headlight will turn in a corresponding direction with the front wheels of the automobile at all times, thus efficiently and thoroughly illuminating the path of the automobile when traveling about a curve in a roadway.

Another object of this invention is the provision of housings carried by the mud guards of an automobile and having headlights journaled thereon and which are connected to the steering mechanism of the automobile, so that they will turn in a corresponding direction with the front wheels.

A further object of this invention is the provision of means for connecting the headlights together and a flexible cable connected to one of the headlights and to a gear carried by the axle of the automobile and operatively connected with the steering mechanism so that upon movement of the steering mechanism to turn the front wheels, the gear will be rotated turning the headlights through the flexible cable.

A further object of this invention is the provision of a casing surrounding the gear and supporting the same upon the axle and having slidably mounted therein a rack bar which meshes with the gear and is in turn pivoted to a rod which is pivotally connected to the steering mechanism of the automobile, whereby upon movement of the steering mechanism, the rack bar will rotate the gear at a corresponding direction to turn the headlights.

A still further object of this invention is the provision of an automobile headlight of the above stated character, which shall be simple, durable and efficient and which may be manufactured and sold at a comparatively low cost.

With these and other objects in view as will become more apparent as the description proceeds, the invention consists of certain novel features of construction, combination and arrangement of parts as will be hereinafter more fully described and claimed.

For a complete understanding of my invention, reference is to be had to the following description and accompanying drawing, in which:—

Figures 2, 3, 4:
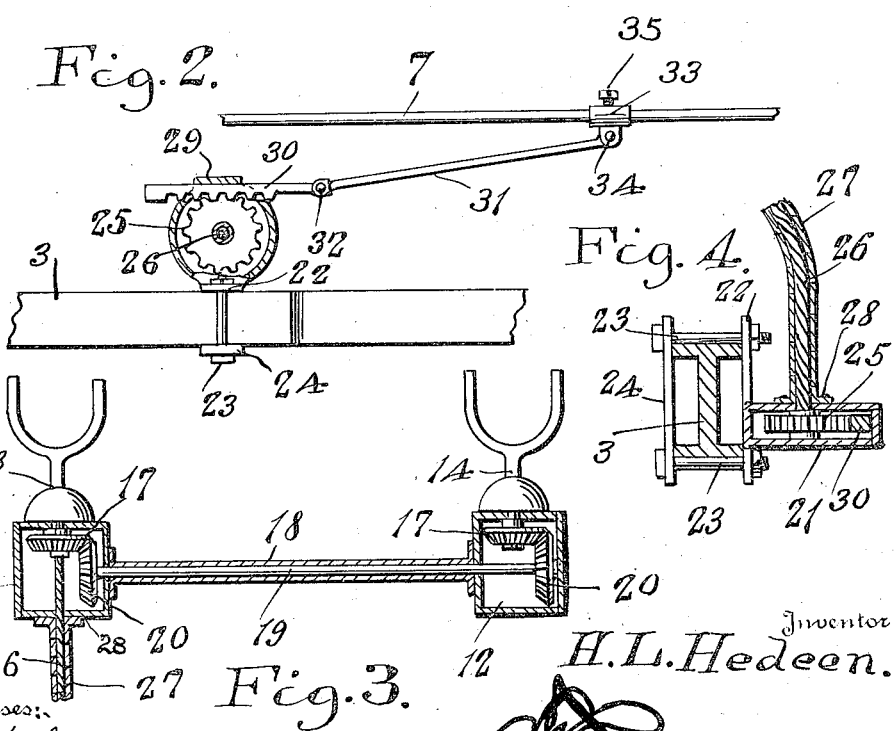

Figure 1 is a front elevation of an automobile having headlights applied thereto, which are constructed in accordance with my invention, Fig. 2 is a fragmentary plan view partly in section illustrating the means of connecting the gear to the steering mechanism, Fig. 3 is a fragmentary vertical sectional view of the means for connecting the headlights together, and Fig. 4 is a detail sectional view of the gear having the cable connected thereto and the manner of mounting the gear to the front axle.

Referring in detail to the drawing, the numeral 1 indicates the body of an automobile, mounted upon a chassis 2 which is secured to the front axle 3 by the springs 4. The front axle 3 has the usual steering knuckles 5 on which are mounted the front wheels 6 and are connected together by the connecting rod 7. Secured to the chassis 2 are the usual mud guards 8, that overlie the front wheels 6. The foregoing description relates to a well known construction of an automobile and to which my invention is applied.

Brackets 9 and 10 are secured to the inner faces of the mud guards 8 adjacent their forward ends and are curved downwardly and inwardly in the direction of the body 1 to support housings 11 and 12. The housings 12 and 11 have journaled in their upper walls lamp standards 13 and 14, which have the usual forked ends to receive the headlights 15 and 16. The lamp standards 13 and 14 extend into the housings 11 and 12 and have beveled gears 17 secured thereto. A tubular member 18 connects the housings 11 and 12 together and has journaled therein a rod 19, which has its ends disposed within the housings and has mounted upon each end a beveled gear 20. The beveled gears 20 are in mesh with the beveled gears 17 upon the lamp standards, whereby the headlights are compelled to rotate or turn in a corresponding direction with each other.

A casing 21 is formed upon a base 22, which is apertured to receive bolts 23, which surround the axle 3 and are carried by a plate 24 for clamping the casing 21 to the axle. The casing 21 has journaled therein a gear 25 which has secured centrally thereof a flexible shaft 26 that extends through a flexible tubing 27. One end of the flexible tubing 27 is secured to the casing 21 as illustrated at 28 and has its other end secured to the housing 11. The upper end of the shaft 26 extends into the housing 11 and is secured to the lower end of the lamp standard 13.

The casing 21 has a bearing 29 formed thereon for slidably receiving a rack bar 30, the teeth of which mesh with the gear 25. The rack bar 29 is pivoted to a rod 31 as illustrated at 32. The rod 31 has its other end pivoted to a clamp 33 as illustrated at 34. The clamp 33 is held upon the connecting rod 7 by a set screw 35 whereby upon movement of the connecting rod 7 in either direction to turn the front wheels 6, the rack bar 30 will be moved in a corresponding direction by the rod 31, rotating the gear 25 which turns the headlights 15 and 16 in a corresponding direction by the shaft 26.

While I have shown and described the preferred embodiment of my invention, it will be understood that minor changes in construction, combination and arrangement of parts may be made without departing from the spirit and scope of the invention as claimed.

What is claimed is:

1. The combination with an automobile including a body and a front axle having a steering mechanism, of lamp standards journaled to the body, means for connecting the lamp standards together, headlights carried by the lamp standards, a flexible shaft connected to one of the lamp standards, a casing secured to the axle, a gear journaled in the casing and connected to the shaft, a rack bar slidable in said casing and in mesh with the gear, and a rod pivoted to the rack bar and to the steering mechanism to turn the headlights.

2. The combination with an automobile including a body on an axle and a steering mechanism, of a pair of housings, secured to the body, lamp standards journaled in said housings, headlights carried by said lamp standards, means for connecting the lamp standards together, a flexible tube connected to the housings, a flexible shaft extending through a tube and having one end connected to one of the lamp standards within one of the housings, a casing secured to the axle, a gear journaled in the casing and connected to the shaft, a bearing formed on said casing, a rack bar slidable in said gearing and in mesh with the gear, and means for connecting the rack bar to the steering mechanism to turn the headlights.

In testimony whereof I affix my signature in presence of two witnesses.

HERBERT L. HEDEEN.

Witnesses:
    GUY PARKER,
    LESLIE BRANSON.

Copies of this patent may be obtained for five cents each, by addressing the "Commissioner of Patents, Washington, D. C."